UNITED STATES PATENT OFFICE.

LEWIS S. CHICHESTER, OF BROOKLYN, NEW YORK, ASSIGNOR TO CHARLES F. CHICHESTER, OF SAME PLACE.

IMPROVEMENT IN ARTICLES OF FOOD FROM CEREALS.

Specification forming part of Letters Patent No. 136,305, dated February 25, 1873.

*To all whom it may concern:*

Be it known that I, LEWIS S. CHICHESTER, of Brooklyn, Kings county, State of New York, have invented an Improvement in the Process of Preparing Cereals for use, of which the following is a specification:

The object of this invention is to prepare wheat, oats, corn, and other grain for use as food by a cooking operation, so that it will be in a condition for almost immediate use, and furnish a palatable and nutritious food, possessing the various properties required for the system, and the material is not liable to be injured by time if kept from moisture.

I take the wheat or other cereal and clean and scour the same sufficiently to remove foreign matter. The grain is then reduced to a coarse flour or meal by any suitable apparatus. The meal is then mixed with water and thoroughly kneaded into a stiff dough that is rolled out and cut up or separated into suitable-sized pieces and baked in a slow oven so as to thoroughly dry and cook the grain. The glutinous matter of the grain is swelled by the water and thoroughly cooked by the heat; and the particles of starch are broken by the heat, and partially converted into glucose or gummy material that is soluble, and is incorporated throughout the baked material.

It is preferable that the material be rolled out into thin sheets, so that the heat may operate with uniformity and without risk of any portion being burned.

The sheets or pieces of cooked cereals are broken and ground up into a flour or meal of the desired fineness, and the same is ready for packing, sale, or use.

When moistened with water and slightly boiled the aforesaid material forms a food superior to the ordinary oatmeal or cracked wheat or hominy, because it is of a sweeter and more delicious flavor. There is not any bitter or uncooked taste, even when prepared for use with rapidity, because of the previously-cooked condition of the meal. This material may be made up in the form of bread, rolls, cakes, &c., according to the wish of the user, and will be found palatable, wholesome, and easily digested. Two or more separate cereals may be mixed together in forming the dough previous to baking. In consequence of the action of the heat all larvæ, insects, or spores are destroyed, and the meal thoroughly desiccated, so that it will remain unchanged if kept from moisture.

This present article is to be distinguished from that set forth in my specification dated August 12, 1872, for infants' food, (allowed September 4, 1872,) in which portions of the grain are separated and other materials added; and also from crackers, in which a mixture is made with flour of other materials. In my article the grain is treated as a whole and alone without admixture of other ingredients, so that the grain contains all the nutritious materials naturally found in it.

I claim as my invention—

The meal or flour prepared by the process herein specified.

Dated November 19, 1872.

LEWIS S. CHICHESTER.

Witnesses:
GEO. T. PINCKNEY,
CHAS. H. SMITH.